(12) United States Patent
Williams et al.

(10) Patent No.: US 11,061,880 B2
(45) Date of Patent: Jul. 13, 2021

(54) DATA STRUCTURE WITH IDENTIFIERS

(71) Applicant: Hewlett-Packard Development Company, L.P., Houston, TX (US)

(72) Inventors: Kevin Williams, San Diego, CA (US); Amit Kumar Singh, Houston, TX (US); Gaurav Roy, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 528 days.

(21) Appl. No.: 15/880,447

(22) Filed: Jan. 25, 2018

(65) Prior Publication Data

US 2019/0228089 A1 Jul. 25, 2019

(51) Int. Cl.
*G06F 16/22* (2019.01)
*G06F 16/24* (2019.01)
*G06F 3/06* (2006.01)

(52) U.S. Cl.
CPC ........ *G06F 16/2282* (2019.01); *G06F 16/221* (2019.01); *G06F 16/24* (2019.01); *G06F 2003/0697* (2013.01)

(58) Field of Classification Search
CPC ..... G06F 16/2282; G06F 16/221; G06F 16/24
USPC ...................................................... 707/802
See application file for complete search history.

(56) References Cited

U.S. PATENT DOCUMENTS

| | | | |
|---|---|---|---|
| 5,930,785 A | 7/1999 | Lohman et al. | |
| 7,437,379 B2 | 10/2008 | Brookler et al. | |
| 7,814,047 B2 * | 10/2010 | Jain | G06F 16/86 707/602 |
| 8,539,359 B2 * | 9/2013 | Rapaport | G06Q 10/10 715/751 |
| 8,909,599 B2 | 12/2014 | Khaladkar et al. | |
| 9,015,556 B2 | 4/2015 | Leggette et al. | |
| 9,195,675 B2 | 11/2015 | Rose et al. | |
| 9,405,858 B2 | 8/2016 | Attaluri et al. | |
| 9,507,842 B2 * | 11/2016 | Knoll | G06F 16/24552 |
| 9,720,939 B1 | 8/2017 | Andrews et al. | |
| 2002/0123993 A1 * | 9/2002 | Chau | G06F 16/86 |
| 2005/0165815 A1 * | 7/2005 | Ozzie | G06F 16/986 |
| 2006/0083254 A1 * | 4/2006 | Ge | H04L 49/50 370/401 |
| 2010/0274573 A1 * | 10/2010 | Feied | G06Q 50/22 705/2 |
| 2015/0205823 A1 * | 7/2015 | Rundle | G06F 16/219 707/695 |
| 2015/0205831 A1 * | 7/2015 | Rundle | G06F 16/219 707/695 |
| 2017/0242629 A1 | 8/2017 | Kephart et al. | |

FOREIGN PATENT DOCUMENTS

CN 106844855 A 6/2017

* cited by examiner

*Primary Examiner* — Dung K Chau (74) *Attorney, Agent, or Firm* — Perry + Currier Inc (57) ABSTRACT

A system is provided including a memory in communication with a processor. The memory is to store a value of an attribute. The processor is to obtain from a source data structure the value. The processor is also to store in a further data structure the value in association with a descriptor identifying the source data structure. Moreover, the processor is to store in the further data structure an identifier in association with the value. The identifier is incrementable and unique to the value among values associated with the descriptor. In addition, the processor is to output the further data structure.

19 Claims, 6 Drawing Sheets

| Deviceid (210) | Storage Type (215) | Date (220) |
|---|---|---|
| AS45D-4DD9J-CMNWY-CNPW8 | USB | 2016-04-06 |
| UNCW1-W735C-NW2C7-C5PUD | HDD | 2017-08-12 |

225

| Companyid (230) | Company Name (235) | Date (240) |
|---|---|---|
| U9R43-SPE43-WF5NP-C659Y | Saltee Nuts, Inc | 2016-06-14 |
| UYNW6-8SER4-PWC36-UEC4S | Acme Bolts, Ltd | 2017-01-23 |

245

| Value (250) | Identifier (255) | Descriptor (260) |
|---|---|---|
| AS45D-4DD9J-CMNWY-CNPW8 | 1 | device.deviceid |
| UNCW1-W735C-NW2C7-C5PUD | 2 | device.deviceid |
| U9R43-SPE43-WF5NP-C659Y | 1 | company.companyid |
| UYNW6-8SER4-PWC36-UEC4S | 2 | company.companyid |
| Saltee Nuts, Inc | 1 | company.companyname |
| Acme Bolts, Ltd | 2 | company.companyname |
| HDD | 1 | device.storagetype |
| USB | 2 | device.storagetype |

265

| Deviceid (210) | Storage Type (215) | Date (220) |
|---|---|---|
| 1 | 2 | 2016-04-06 |
| 2 | 1 | 2017-08-12 |

270

| Companyid (230) | Company Name (235) | Date (240) |
|---|---|---|
| 1 | 1 | 2016-06-14 |
| 2 | 2 | 2017-01-23 |

275

| Deviceid (210) | Storage Type (215) | Date (220) |
|---|---|---|
| AS45D-4DD9J-CMNWY-CNPW8 | USB | 2016-04-06 |
| UNCW1-W735C-NW2C7-C5PUD | HDD | 2017-08-12 |

280

| Companyid (230) | Company Name (235) | Date (240) |
|---|---|---|
| U9R43-SPE43-WF5NP-C659Y | Saltee Nuts, Inc | 2016-06-14 |
| UYNW6-8SER4-PWC36-UEC4S | Acme Bolts, Ltd | 2017-01-23 |

| Value (250) | Identifier (255) | Descriptor (260) |
|---|---|---|
| AS45D-4DD9J-CMNWY-CNPW8 | 1 | device.deviceid |
| UNCWI-W735C-NW2C7-C5PUD | 2 | device.deviceid |
| U9R43-SPE43-WF5NP-C659Y | 1 | company.companyid |
| UYNW6-8SER4-PWC36-UEC4S | 2 | company.companyid |
| Saltee Nuts, Inc | 1 | company.companyname |
| Acme Bolts, Ltd | 2 | company.companyname |
| HDD | 1 | device.storagetype |
| USB | 2 | device.storagetype |

305

| Companyid (310) | Company Name (315) | Date (320) |
|---|---|---|
| U9R43-SPE43-WF5NP-C659Y | Acme Bolts, Ltd | 2016-06-14 |
| UYNW6-8SER4-PWC36-UEC4S | Saltee Nuts, Ltd | 2017-01-23 |
| <blank> | Saltee Nuts, Ltd | 2017-02-23 |
| UYNW6-8SER4-PWC36-UEC4S | Saltee Nuts, Ltd | 2017-03-23 |

325

| Companyid (310) | Company Name (315) | Date (320) |
|---|---|---|
| 1 | 2 | 2016-06-14 |
| 2 | 1 | 2017-01-23 |
| <blank> | 1 | 2017-02-23 |
| 2 | 1 | 2017-03-23 |

330

| Companyid (310) | Company Name (315) | Date (320) |
|---|---|---|
| 1 | 2 | 2016-06-14 |
| 2 | 1 | 2017-01-23 |
| 2 | 1 | 2017-02-23 |
| 2 | 1 | 2017-03-23 |

335

| Companyid (310) | Company Name (315) | Date (320) |
|---|---|---|
| U9R43-SPE43-WF5NP-C659Y | Acme Bolts, Ltd | 2016-06-14 |
| UYNW6-8SER4-PWC36-UEC4S | Saltee Nuts, Ltd | 2017-01-23 |
| UYNW6-8SER4-PWC36-UEC4S | Saltee Nuts, Ltd | 2017-02-23 |
| UYNW6-8SER4-PWC36-UEC4S | Saltee Nuts, Ltd | 2017-03-23 |

DATA STRUCTURE WITH IDENTIFIERS

BACKGROUND

Data may be collected and organized in data structures stored in computer-readable memory. These data structures may store large volumes of data collected over time. Computers may be used to retrieve and process the data stored in the data structures.

DETAILED DESCRIPTION

Increasing volumes of data are being generated, collected, and processed. Some examples of sources of such data include connected sensors, connected objects or things within an Internet-of-Things scheme, and connected devices within a Device-as-a-Service (DaaS) ecosystem. In a DaaS ecosystem a DaaS provider provides the use of devices, such as computing devices, to customers. The DaaS provider may retain responsibility for the devices, for example to update and/or maintain the devices.

The DaaS provider may collect data from the devices and/or customers within the DaaS ecosystem to assist with maintaining the devices and their performance. This data may be in the form of time-series data to allow for monitoring the performance of the devices and updating the status of the customers over time. Volume of such data may become large as there may be large numbers of customers and large numbers of devices per customer, subject to data collection over long periods of time. In addition, some of the data values may comprise long strings such as alpha-numeric serial and company numbers, and company names.

Retrieving, processing, and storing data values that are in the form of long strings may use correspondingly large amounts of memory and/or computational resources such as processing time and power. Replacing the long strings with shorter identifiers during data processing and/or storage may reduce the amount of computational resources and memory used to process and/or store the data. Processing and/or storing the fewer characters in the shorter strings of the identifiers may use relatively fewer computational resources and memory compared to those used to process and/or store the larger number of characters in the relatively longer strings of the data values. A reference data structure, such as a lookup table, may be used to convert between the data values and their corresponding identifiers.

Figure 1:
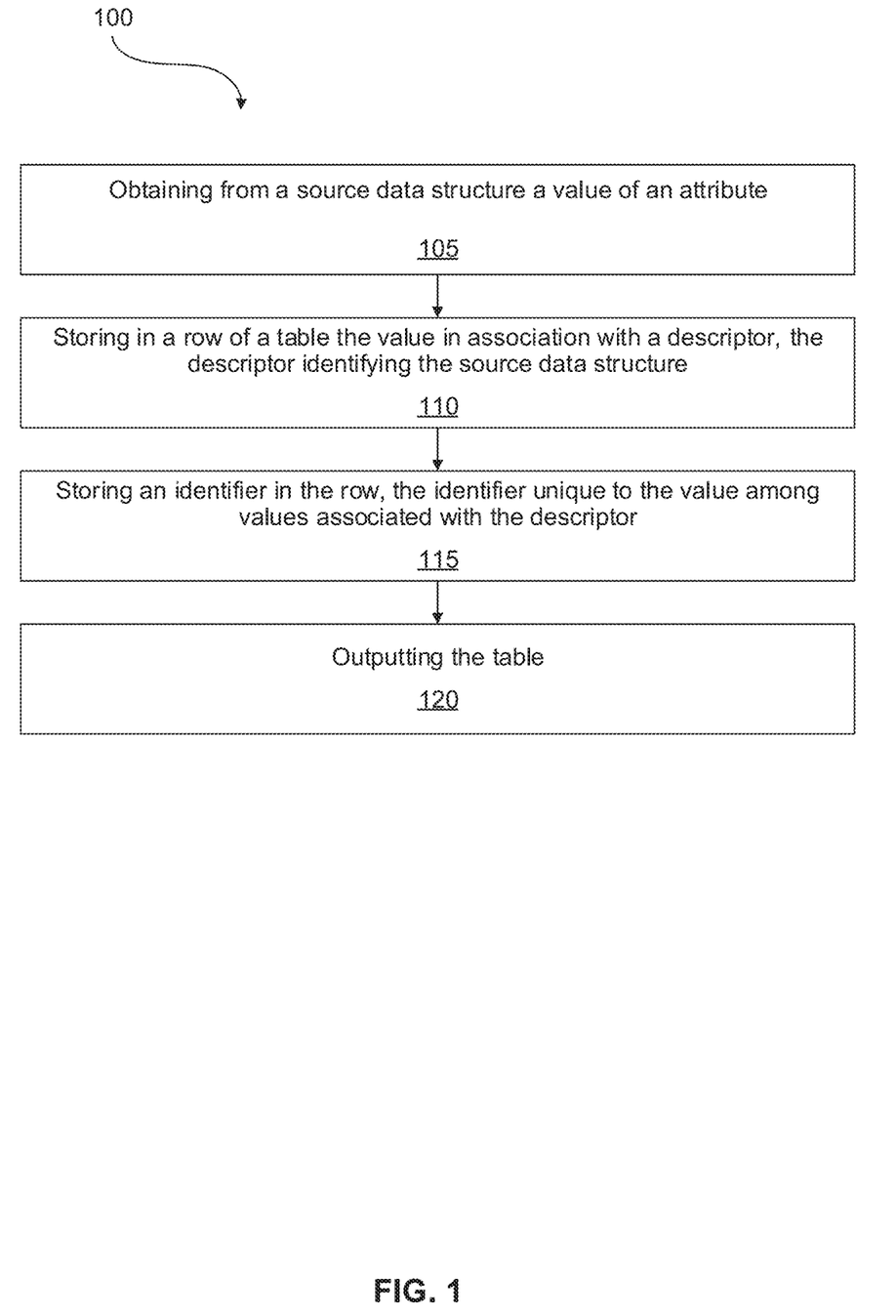
FIG. 1 shows a flowchart of an example method that may be used to generate a reference data structure.

FIG. 1 shows a flowchart of an example method that may be used to generate a reference data structure, such as a reference data table. This type of reference data table may also be referred to as a lookup table. At box 105 of method 100, a value of an attribute may be obtained from a source data structure. The source data structure may comprise a data table or another data structure in which the value is organized, formatted, and/or stored.

At box 110, the value may be stored in association with a descriptor of the attribute in a row of a table. This table may be used as a reference or lookup table. The descriptor may identify the source data structure. Storing the value and the descriptor in the same row associates one with the other. In other examples, the value and the descriptor may be associated with one another in a different manner, and/or may be stored in a data structure other than a table.

By being a descriptor of the attribute and/or by identifying the source data structure, the descriptor may provide a link between the value stored in the table and the original source data structure from which the value was obtained. This link, in turn, may allow for later conversion between the value and an identifier of the value in the source data structure based on the information stored in the table.

At box 115 an identifier may be stored in the same row as the value and the descriptor. Storing the identifier in the same row as the value and the descriptor associates the identifier with the value and the descriptor. In other examples, the identifier may be associated with the value and the descriptor in a different manner, and/or may be stored in a data structure other than a table.

The identifier may be unique to the value among values associated with the descriptor. In other words, if there are other values stored in other rows of the table, which other values are different from the value but are associated with the same descriptor, the identifier may be different from the other identifiers of the other values.

In some examples, the identifier may comprise a string having a number of characters that is likely to be fewer than the number of characters of the string of the value. In this manner, the identifier may provide a shorter string, i.e. a string having fewer characters, than its corresponding value.

In some examples, the identifier may be incrementable. An incrementable identifier may be one where the next identifier may be obtained by incrementing the previous identifier. Incrementable identifiers may be those identifiers where, in order to determine the next identifier to be used, it is not necessary to consult a reference such as a lookup table.

A series of incrementable identifiers may be deterministic, in that given an identifier, the next identifier is quickly obtainable. Eliminating or reducing the need to consult a reference to determine the next identifier may reduce the amount of computational resources such as time, energy, working memory, and processing power used to assign identifiers to subsequent values to generate the table. Examples of incrementable identifiers include numbers, such as natural numbers, integers, and the like.

Furthermore, at box 120 the table may be output. To output the table, the table may be stored in a memory, sent to an output terminal, communicated to another component or to another system, or the like. In some examples, before completing box 120, boxes 105, 110, and 115 may be repeated to add additional rows of other values and their corresponding descriptors and identifiers to the table.

In the examples where the value, the descriptor, and the identifier are associated with one another in a manner other than storing them in the same row of a table and/or are associated with one another and stored in a data structure other than a table, method 100 may output this other data structure instead of the table.

In some examples, the source data structure may comprise a data table having an associated table identifier. For example, the table identifier may comprise a table name, and the like. In addition, the data table may comprise a column having an associated column identifier. For example, the column identifier may comprise a column name, column header, or the like. The value may be stored in the column.

In some examples, the descriptor may comprise the table identifier and the column identifier. For example, the descriptor may be formatted as "tablename.columnname". It is contemplated that some formatting or other modifications may be made in forming the descriptor from the table and column identifiers. For example, spaces in the table and column identifiers may be removed when those identifiers are incorporated in the descriptor. In other examples, the descriptor may have a different content and/or be formatted differently than "tablename.columnname".

Furthermore, in some examples method 100 may further comprise obtaining from the source data structure a second value different from the value. This second value may be stored in a second row of the table in association with the same descriptor as for the value. For example, when the source data structure is a source data table, the value and the second value may share the same descriptor if both the value and the second value are from the same column of the source data table. Moreover, a second identifier may be generated and stored in the second row in association with the second value and the descriptor.

The second identifier may be generated by incrementing the identifier and/or by choosing the next-incremented identifier. Furthermore, this second row may be a row of the table other than the row containing the value and its associated identifier and descriptor. The second row need not be the second row from the top or bottom of the table. Moreover, in some examples this association of the second value, and its associated second identifier and descriptor may also be stored in a reference data structure other than a row of a table.

In addition, in some examples method 100 may further comprise obtaining a third value. This third value may be obtained from the same source data structure as the value, or from a different source. This third value may have a third descriptor different than the descriptor of the value. For example, when the values are obtained from source data tables, the value and the third value may be from different source tables or from different columns of the same source data table. The third value may be stored in a third row of the table in association with a corresponding third descriptor. Moreover, a third identifier may be stored in the third row, in association with the third value and its third descriptor.

In some examples, the third identifier may be the same as the identifier since the third value has a third descriptor different than the descriptor, and the identifiers need not be unique to different values when those different values are associated with different respective descriptors. Further, this third row may be a row of the table other than the row containing the value and its associated identifier and descriptor. The third row need not be the third row from the top or bottom of the table. Moreover, in some examples this association of the third value, and its associated third identifier and third descriptor may also be stored in a reference data structure other than a row of a table.

Furthermore, in some examples, once the reference data table of method 100 has been generated, the table may be used in the process of generating modified data, transforming the modified data, and then generating and outputting further modified data from the transformed data. In such examples, method 100 may further comprise obtaining the identifier from the table. Then the modified data may be generated by replacing the value in the source data structure with the identifier. Next, the transformed data may be generated by applying a transformation to the modified data. Moreover, further modified data may be output by obtaining from the table the value associated with the identifier and replacing in the source data structure the identifier with the value.

It is contemplated that in some examples, the modified data may be generated by creating a copy of the source data structure in which the value is replaced by its corresponding identifier. This copy may comprise a copy or second source data structure. Similarly, the further modified data may be generated and/or output by replacing the identifiers with their corresponding values in the second source data structure.

In cases where the identifier comprises fewer characters than the value, performing the transformation using the identifier may use less memory and/or computational resources compared to performing the transformation, and the associated processing or storage of the value, using the longer string of the value.

Moreover, in some examples, once the reference data table of method 100 has been generated, the value in the table may be compared against the version of the value stored in the source data structure. To perform this comparison, the description may be used to identify the source data structure, and then the comparison may be performed between the value associated with the descriptor in the table and the value in the source data structure, or the portion of the source data structure, identified by the descriptor.

Such a comparison may allow for detecting and/or correcting errors arising from discrepancies between the value as stored in the table and the value stored in the source data structure. Such discrepancies may arise from errors in copying data from the source data structure to the table. In addition, such discrepancies may arise when the value in the source data structure has been updated since the generation of the table, thereby rendering the value in the table out of date. In such cases, scheduled and/or on-demand comparison may be used to update the value in the table to reflect changes in the value stored in the source data structure.

Figure 2:
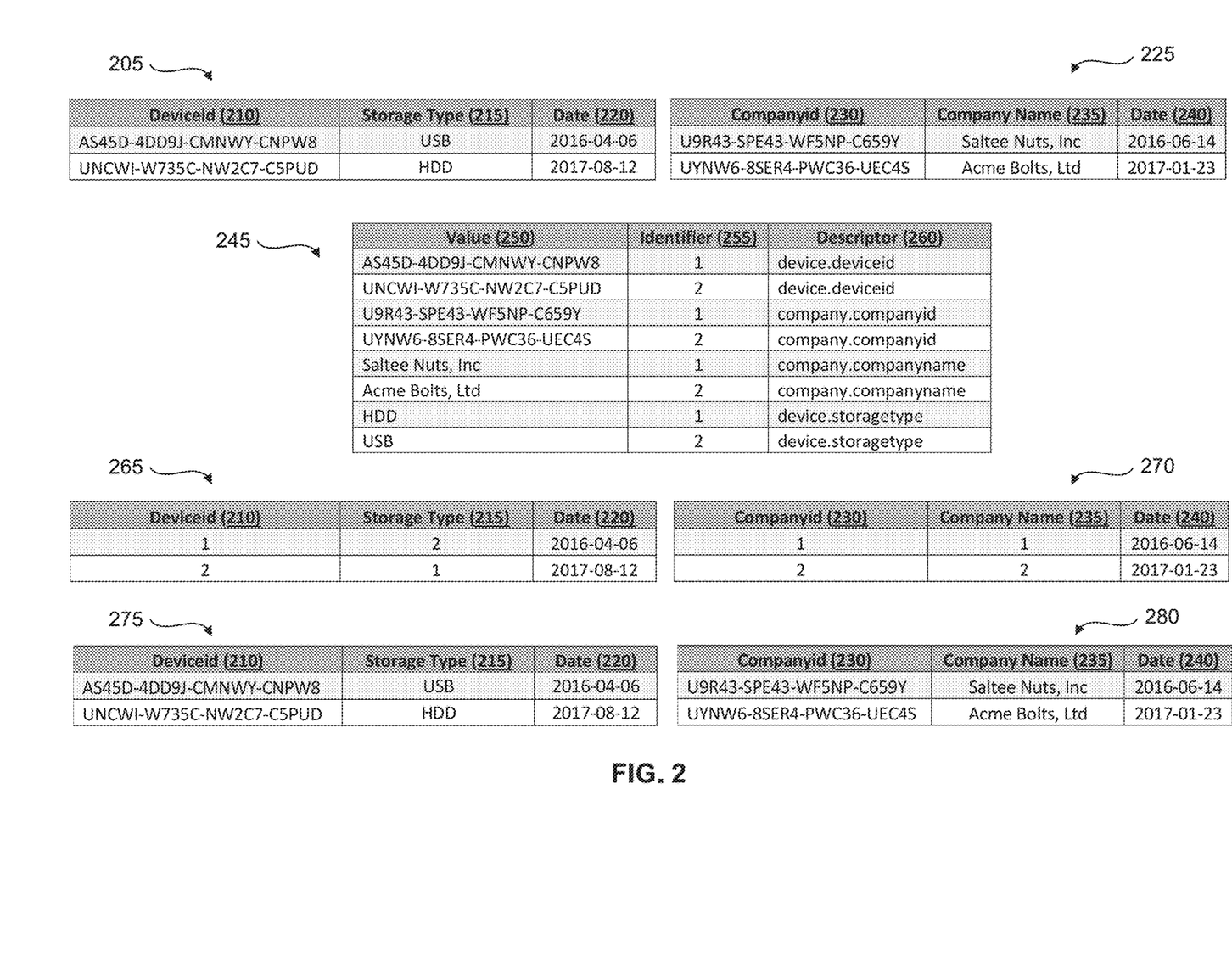
FIG. 2 shows example data tables.

FIG. 2 shows example data tables. Example methods disclosed herein will be described with reference to the example tables shown in FIG. 2. The reference to the tables of FIG. 2 is for demonstrative purposes, and the methods disclosed herein are not limited to or by the example data values or data structures shown in FIG. 2.

Table 205, shown in FIG. 2, is an example source data table. Table 205 may have a table identifier, which table identifier may comprise a table name. The table name for table 205 may be "device". Table 205 may also comprise column identifiers which comprise column names, which column names are deviceid 210, storage type 215, and date 220. Similarly, table 225 is another example source data table. Table 225 may have a table identifier, which table identifier may comprise a table name. The table name for table 225 may be "company". Table 225 may also comprise column identifiers which comprise column names, which column names include companyid 230, company name 235, and date 240.

To generate the lookup table 245, a value "AS45D-4DD9J-CMNWY-CNPW8" may be obtained from table 205. The value "AS45D-4DD9J-CMNWY-CNPW8" is a serial number comprising a long, 23-character string comprising letters, numbers, and dashes. The value "AS45D-4DD9J-CMNWY-CNPW8" is then stored in a row of table 245 in association with a descriptor "device.deviceid".

The descriptor "device.deviceid" comprises the table name "device" of table 205 and the column name "deviceid"

of the leftmost column of table 205, in which column value "AS45D-4DD9J-CMNWY-CNPW8" was originally stored. The descriptor "device.deviceid" comprises a description of the attribute, i.e. deviceid, indicating that the value "AS45D-4DD9J-CMNWY-CNPW8" is a device ID serial number. The "device" portion of the descriptor "device.deviceid" also identifies by name table 205 as the source data structure for value "AS45D-4DD9J-CMNWY-CNPW8".

In addition, an identifier "1" is stored on the same row of table 245 as the value "AS45D-4DD9J-CMNWY-CNPW8" and its associated descriptor "device.deviceid". The identifier "1" is unique to the value "AS45D-4DD9J-CMNWY-CNPW8" among all values associated with the descriptor "device.deviceid". For example, when a second value "UNCWI-W735C-NW2C7-C5PUD" is added from table 205 to table 245, which second value has the same descriptor as the value "AS45D-4DD9J-CMNWY-CNPW8", the second value "UNCWI-W735C-NW2C7-C5PUD" is assigned the next incremented identifier "2". As seen in table 245, the identifiers "1" and "2" comprise strings of fewer characters than device ID serial number values "AS45D-4DD9J-CMNWY-CNPW8" and "UNCWI-W735C-NW2C7-C5PUD".

The values, identifiers, and descriptors are stored in respective columns of table 245, the columns having as their names value 250, identifier 255, and descriptor 260.

In order to populate the third row of table 245, a third value "U9R43-SPE43-WF5NP-C659Y" is obtained from table 225. The third value is stored in the third row of table 245 in association with its corresponding descriptor "company.companyid". Similar to descriptor "device.deviceid", descriptor "company.companyid" comprises the name of source data table 225 and the name of the column of table 225 where the third value "U9R43-SPE43-WF5NP-C659Y" was originally stored. Since the third value "U9R43-SPE43-WF5NP-C659Y" is associated with a different descriptor than the descriptor of the value "AS45D-4DD9J-CMNWY-CNPW8", the same identifier "1" may be used in association with the third value "U9R43-SPE43-WF5NP-C659Y" as the identifier used in association with the value "AS45D-4DD9J-CMNWY-CNPW8".

The remaining rows of table 245 may be populated with additional values from tables 205 and 225, and with descriptors and identifiers associated with those additional values, in a similar manner as described above. Once table 245 has been generated, it may be used to convert between values and their corresponding identifiers. For example, table 245 is used to obtain table 265 where the values for deviceid 210 and storage type 215 are converted to their corresponding identifiers. Similarly, table 245 is used to obtain table 270 where the value for companyid 230 and company name 235 are converted to their corresponding identifiers.

Processing and/or storage of the data in tables 265 and 270 involve the manipulation and/or storage of the relatively shorter strings of the identifiers compared to the longer strings of the values in tables 205 and 225.

Using table 245, the data in tables 265 and 270 may be converted back to the values shown in tables 205 and 225. For example, in table 265 the value corresponding to identifier "1" in the deviceid 210 column may be obtained as follows: in table 245, the row whose corresponding descriptor comprises "deviceid" and whose corresponding identifier is "1" has an associated value of "AS45D-4DD9J-CMNWY-CNPW8". This value may then be replaced for identifier "1" in the deviceid 210 column of table 265. Table 275 may be obtained by using table 245 to determine the value corresponding to each of the identifiers in table 265, and replacing the identifiers with their corresponding values as indicated in table 245. Table 280 may be obtained from table 270 in a similar manner.

If table 245 were to contain a second row whose descriptor comprised "deviceid" and whose associated identifier was "1" (not shown in FIG. 2), then the name of table 265 may also be used to determine the row in table 245 with the correct descriptor. The name of table 265 may be "device", retained unchanged from table 205. If the target descriptor is further specified as being the descriptor comprising both the column name "deviceid" and the table name "device", and having a corresponding identifier "1", then the target row may be narrowed down to the correct row in table 245, i.e. the row storing the value of "AS45D-4DD9J-CMNWY-CNPW8".

Figure 3:
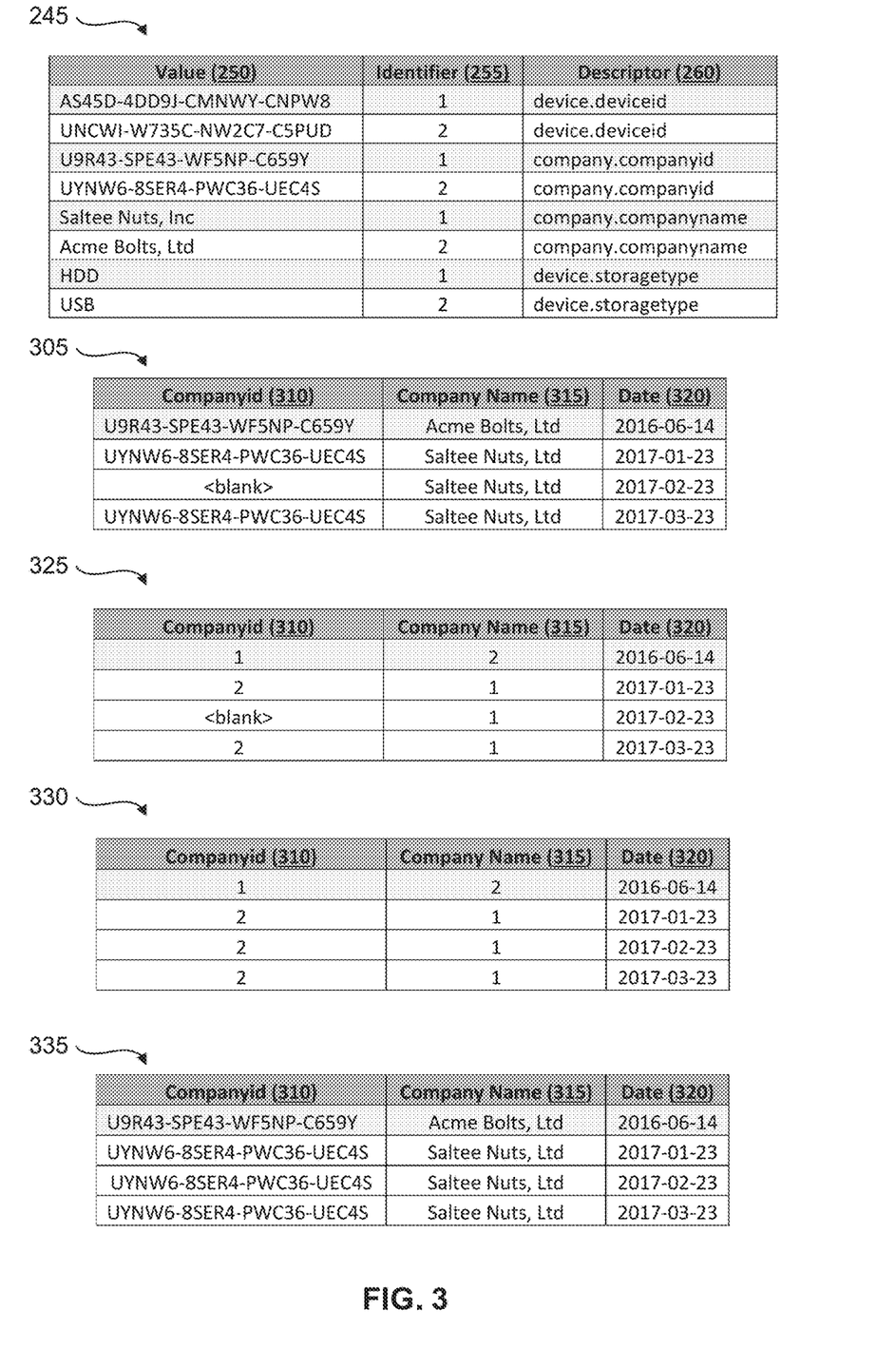
FIG. 3 shows further example data tables.

FIG. 3 also shows example data tables. Table 305 is a source data table similar to table 225, and comprises company ID serial number values, company name values, and date values stored in three corresponding columns having as their names companyid 310, company name 315, and date 320 respectively. A difference between table 225 and table 305 is that table 305 comprises two additional rows of data corresponding to February and March 2017 dates, and the company ID serial number value is missing for February 2017.

In order to facilitate later processing of the data in table 305, an example transformation may be applied to the data in table 305 to fill in the missing serial number value. In order to reduce the computational resources used to apply the transformation, the values in table 305 may be converted into their corresponding identifiers prior to applying the transformation.

Moreover, in order to affect the conversion of values to identifiers, table 245 may be used to determine the identifiers corresponding to the values. Table 325 shows modified data generated by replacing the values in table 305 with their corresponding identifiers. Next, a transformation may be applied to the data in table 325 to fill in the missing company ID for February 2017.

For example, a last-observation-carried-forward imputation may be used to fill in the missing company ID to be the same as its last prior known value. In other words, since the last known value for company ID prior to February was in January 2017 when the value was "UYNW6-8SER4-PWC36-UEC4S", and whose associated identifier is "2", the same value and/or identifier may be carried forward and used to fill in the missing data for February. Table 330 shows transformed data generated by applying the last-observation-carried-forward imputation to the data of table 325. In particular, in table 330, the blank in February is filled with the identifier "2" corresponding to the value "UYNW6-8SER4-PWC36-UEC4S", based on the last-observation-carried-forward imputation.

After the transformation has been completed, the transformed data of table 330 may be further modified by obtaining from table 245 the values associated with the identifiers in table 330, and replacing the identifiers in table 330 with their corresponding values to obtain table 335.

Figure 4:
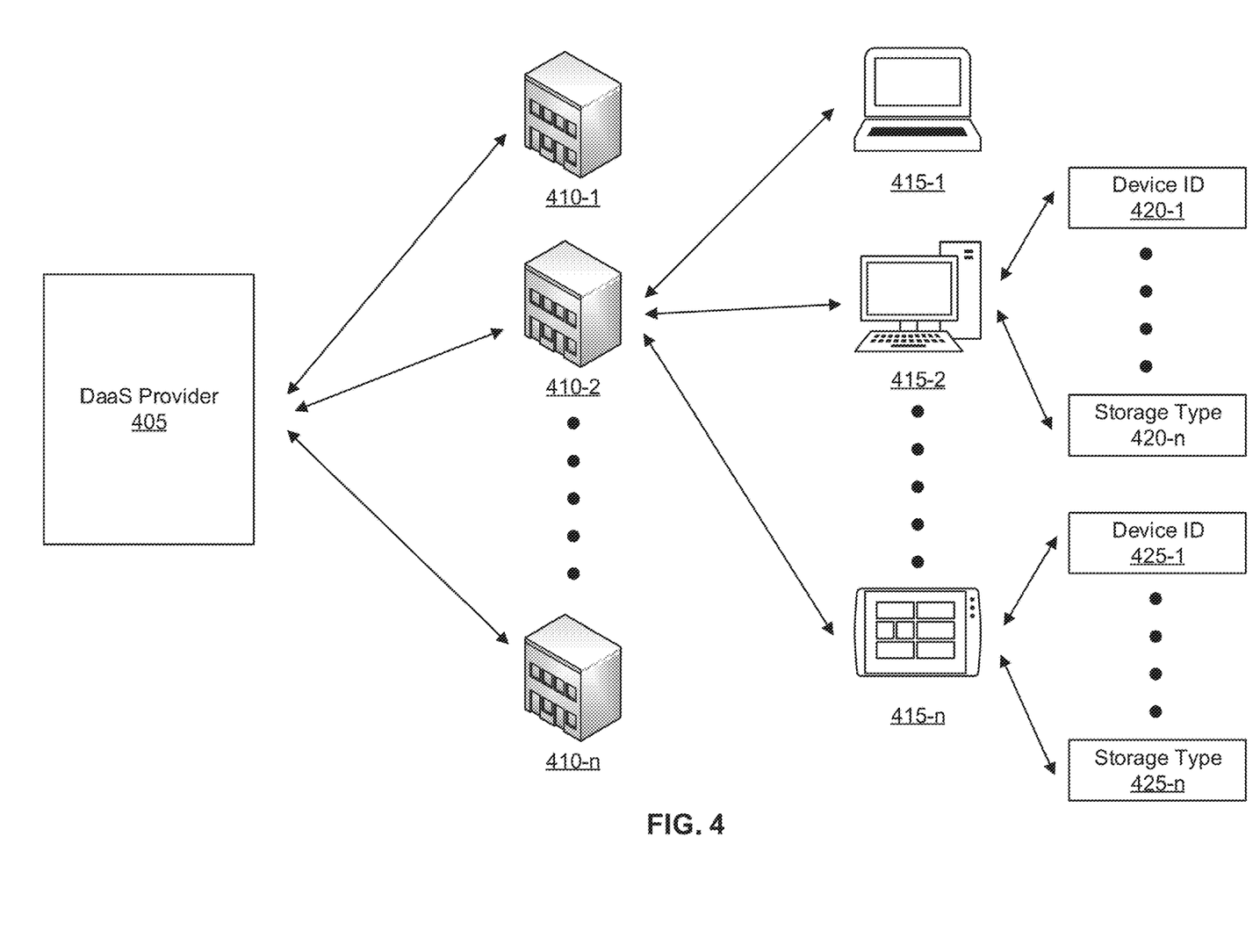
FIG. 4 shows a schematic representation of an example Device-as-a-Service ecosystem.

The methods described herein may be applied in the context of a DaaS ecosystem to reduce the computational resources used to process and/or store the large volumes of data related to customers, the devices corresponding to each customer, and the attribute values corresponding to each device. FIG. 4 shows a schematic representation of an example DaaS ecosystem comprising a DaaS provider 405, which serves customers 410-1, 410-2 to 410-n, collectively referred to as customers 410.

The DaaS provider 405 may provide to each customer a number of devices 415-1, 415-2 to 415-n, collectively referred to as devices 415. While devices are shown in FIG. 4 only for customer 410-2, the other customers may also be provided with devices. Moreover, while devices 415 are shown as being connected to DaaS provider 405 through customer 410-2, it is contemplated that devices 415 may be in direct communication with DaaS provider 405.

Each device may have a number of attributes and collect and report data on the values of those attributes. For example, device 415-2 may have a number of attributes including device ID 420-1 to storage type 420-n. Similarly, device 415-n may have a number of attributes including device ID 425-1 to storage type 425-n. While not shown in FIG. 4, other devices such as device 415-1 may also have attributes and collect and report data on the values of those attributes.

DaaS provider 405 may collect time-series data on device attributes' values to monitor the performance of and diagnose problems relating to devices 415. Moreover, DaaS provider 405 may also collect and monitor data relating to customers 410 such as the customers' subscription status, company number and company name. By providing reference data structures, such as a reference lookup table, that may be used to convert long string attribute values to shorter string corresponding identifiers, the methods described herein may allow processing and/or storing large volumes of data, including data collected in the context of a DaaS ecosystem using computational resources and/or memory reduced compared to using attribute values for processing and storage.

Figure 5:
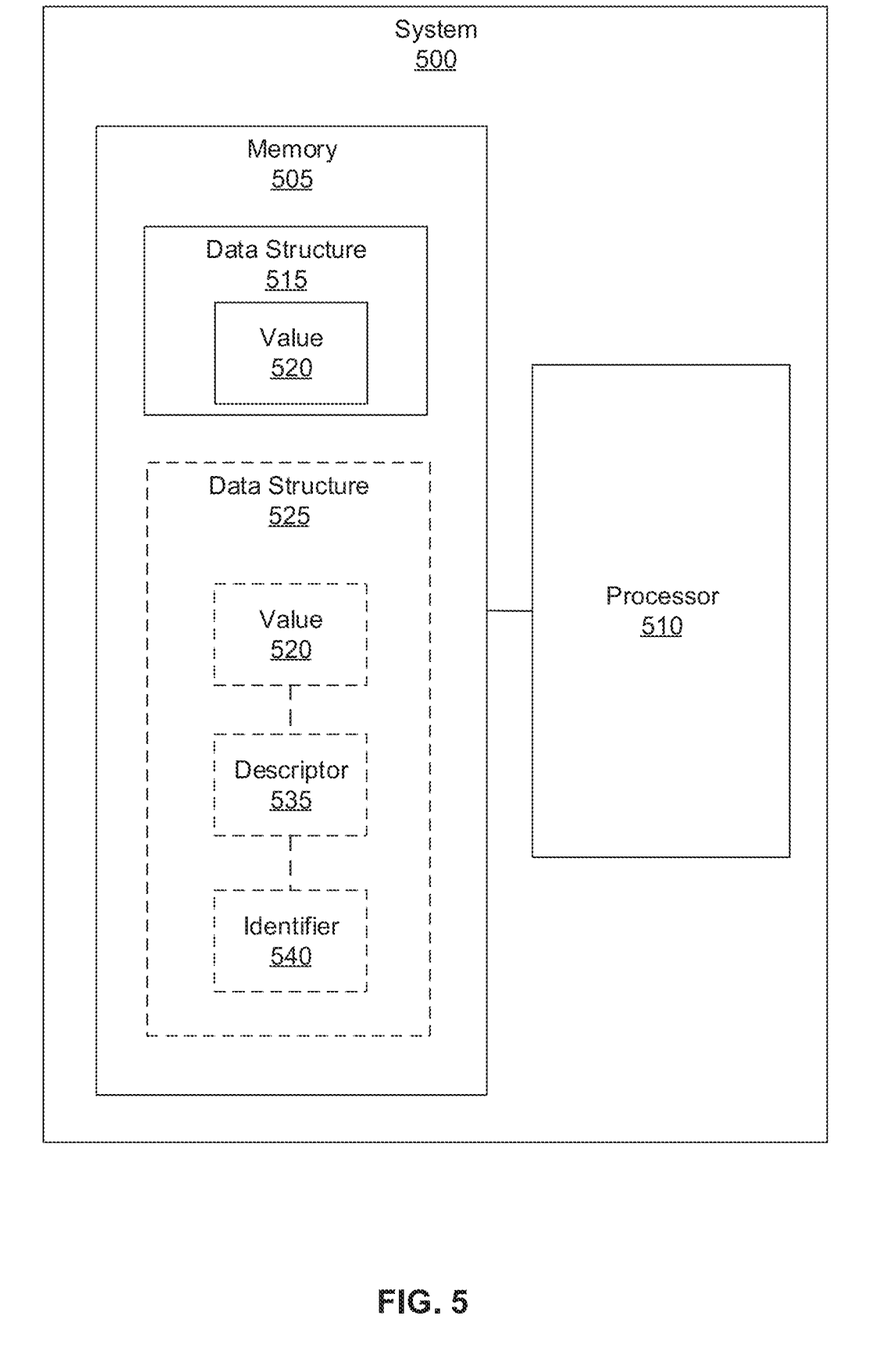
FIG. 5 shows a block diagram of an example computing system.

FIG. 5 shows a system 500 which may be used to generate a reference data structure such as a lookup table. System 500 comprises a memory 505 in communication with a processor 510. Processor 510 may include a central processing unit (CPU), a graphics processing unit (GPU), a microcontroller, a microprocessor, a processing core, a field-programmable gate array (FPGA), or similar device capable of executing instructions. Processor 510 may cooperate with the memory 505 to execute instructions.

Memory 505 may include a non-transitory machine-readable storage medium that may be an electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions. In some example systems, memory 505 may include a database.

Memory 505 may store a value 520 of an attribute in a source data structure 515. Such example source data structures may include a data table and other suitable data structures. Processor 510 may obtain value 520 from source data structure 515. Moreover, processor 510 may store in a further data structure 525 value 520 in association with a descriptor 535.

Descriptor 535 may identify the source of value 520. For example, descriptor 535 may identify and/or indicate that value 520 was obtained from source data structure 515. In some examples, descriptor 535 may also describe the attribute with which value 520 is associated.

Processor 510 may also store in data structure 525 an identifier 540 in association with value 520. Identifier 540 may be incrementable, as described above. Moreover, identifier 540 may be unique to value 520 among values associated with descriptor 535. In other words, if data structure 525 were to contain other values different from value 520 stored in association with descriptor 535, those other values would have corresponding identifiers different than identifier 540.

Furthermore, processor 510 may output data structure 525, for example by storing data structure 525 in memory 505 or another storage inside and/or outside of system 500, by sending data structure 525 to an output terminal, by sending data structure to another system, and the like.

In system 500, data structure 525 and the data stored within it, namely value 520, descriptor 535, and identifier 540, are shown in dashed lines. The use of dashed lines is intended to indicate that in some examples data structure 525 may be stored in system 500 outside of memory 505, or outside of system 500.

In some example systems, data structure 525 may comprise a table, and value 520, descriptor 535, and identifier 540 may be associated with one another by storing them in a given common row of the table. In such examples, data structure 525 may also be referred to as a lookup table.

Moreover in some example systems source data structure 515 may comprise a data table having an associated table identifier, such as a table name. This data table may in turn comprise a column having an associated column identifier, such as a column name or a column header. Value 520 may be stored in the column. In such examples, descriptor 535 may comprise the table identifier and the column identifier. For example, descriptor 535 may be formatted as "tablename.columnname".

Furthermore, in some example systems processor 510 may further obtain from source data structure 515 a second value (not shown) different from value 520. Processor 510 may also store in data structure 525 the second value in association with descriptor 535. In addition, processor 510 may generate a second identifier (not shown) based on identifier 540. For example, the second identifier may be generated by incrementing identifier 540 and/or by choosing the next incremented identifier succeeding identifier 540. Processor 510 may also store this second identifier in data structure 525 in association with the second value.

In addition, in some example systems processor 510 may further obtain a third value (not shown). This third value may be obtained from source data structure 515 or from a different source inside or outside memory 505. Processor 510 may also store in data structure 525 the third value in association with a third descriptor (not shown) different from descriptor 535. As discussed above, the third descriptor may be different than descriptor 535 because the third value is obtained from outside of source data structure 515, and/or because the third value is associated with a different attribute than the attribute to which value 520 is associated. Moreover, processor 510 may store in data structure 525 identifier 540, or a copy thereof, in association with the third value.

Once reference data structure 525 has been generated, in some example systems processor 510 may use data structure 525 as a reference data structure to convert between value 520 and its corresponding identifier 540 in source data structure 515. For example, processor 510 may further obtain identifier 540 from data structure 525. Next, processor 510 may generate modified data by replacing value 520 in source data structure 515 with identifier 540. Next, processor 510 may generate transformed data by applying a transformation to the modified data. Moreover, processor 510 may output further modified data by obtaining from data structure 525 value 520 associated with identifier 540 and replacing identifier 540 with its corresponding value 520 in the source data structure 515. This, in turn, may allow the transformation to be performed using the identifier instead of the value which may comprise a string much longer than the identifier.

The example systems described herein may perform the functions demonstrated in FIGS. 2 and 3, and be used in the context of a DaaS ecosystem, for example as shown in FIG. 4.

Figure 6:
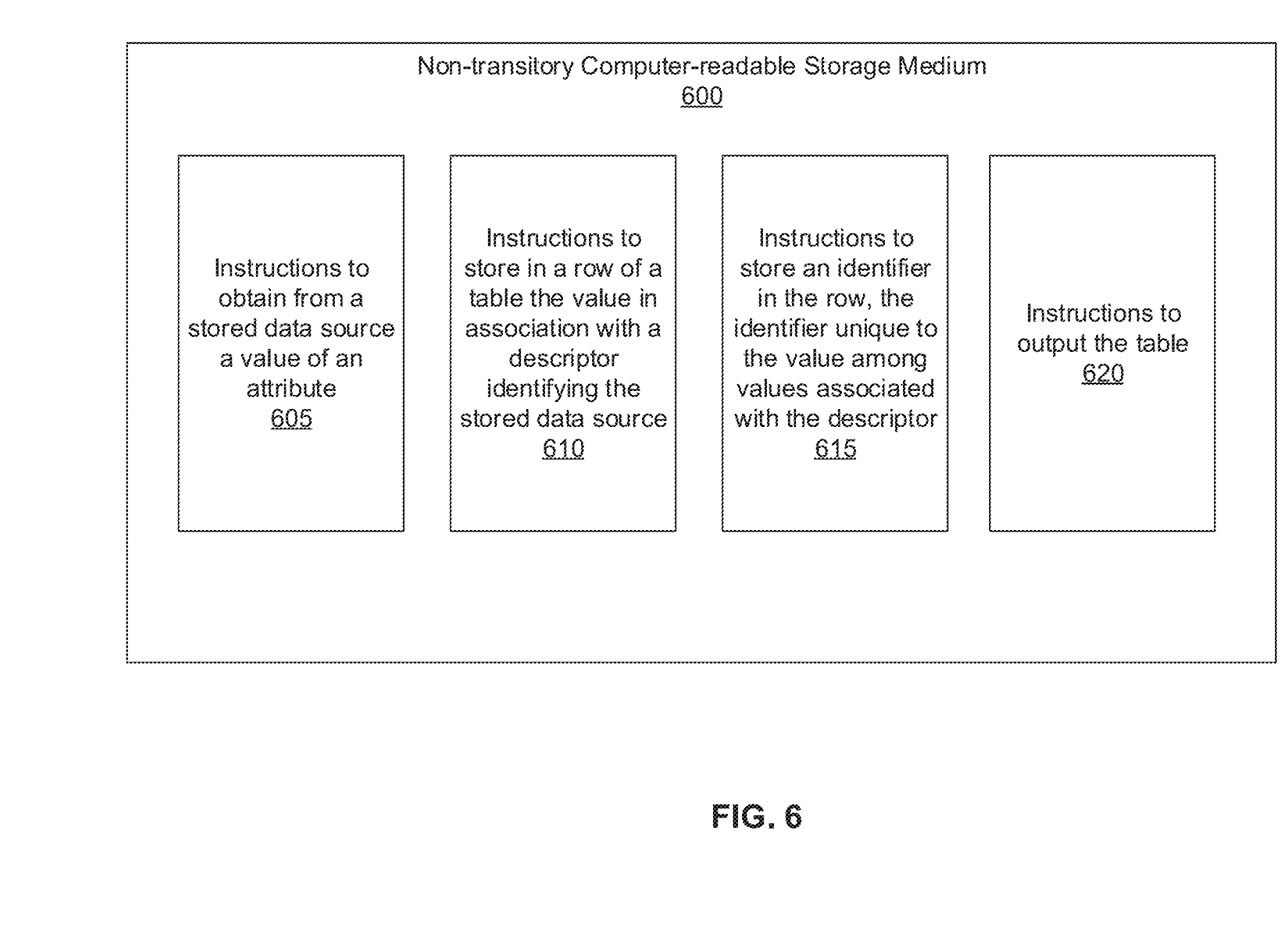
FIG. 6 shows a block diagram of an example computer-readable storage medium.

Turning now to FIG. 6, a non-transitory computer-readable storage medium (CRSM) 600 is shown, which comprises instructions executable by a processor. The CRSM may comprise an electronic, magnetic, optical, or other physical storage device that stores executable instructions. The instructions may comprise instructions 605 to cause the processor to obtain from a stored data source a value of an attribute. In some examples, the stored data source may comprise a data structure or a database. An example of a data structure may comprise a data table.

Moreover, the instructions may comprise instructions 610 to cause the processor to store in a row of a table the value in association with a descriptor. The descriptor may identify the stored data source from which the value was obtained. In some examples, the descriptor may also describe the attribute.

In addition, the instructions may comprise instructions 615 to cause the processor to store an identifier in the row of the table. The identifier may be unique to the value among values associated with the descriptor. In some examples, the identifier may be incrementable.

In addition, the instructions may comprise instructions 620 to cause the processor to output the table, as described above. While the instructions are described as causing the processor to store the value, the descriptor, and the identifier in association with one another in a row of a table, it is contemplated that the value, the descriptor, and the identifier may also be associated with one another in a different manner and/or may be stored in a data structure different than a table.

In some example CRSMs, the stored data source may comprise a data table having an associated table identifier, such as a table name. This data table may in turn comprise a column having an associated column identifier, such as a column name. The value may be stored in the column. When the source data structure is such a table, the descriptor may in turn comprise the table identifier and the column identifier. For example, the descriptor may be formatted as "tablename.columnname".

Moreover, in some example CRSMs, the instructions may further cause the processor to obtain from the stored data source a second value different from the value. The instructions may also cause the processor to store in a second row of the table the second value in association with the descriptor. The instructions may also cause the processor to generate a second identifier by incrementing the identifier. Furthermore, the instructions may cause the processor to store in the second row the second identifier in association with the second value. This second row may be a row of the table other than the row containing the value and its associated identifier and descriptor. The second row need not be the second row from the top or bottom of the table. Moreover, in some examples this association of the second value, and its associated second identifier and descriptor may also be stored in a reference data structure other than a row of a table.

Furthermore, in some example CRSMs, the instructions may further cause the processor to obtain a third value, from the stored data source or from a different source. The instructions may further cause the processor to store in a third row of the table the third value in association with a third descriptor different from the descriptor. Moreover, the instructions may cause the processor to store in the third row the identifier in association with the third value. This third row may be a row of the table other than the row containing the value and its associated identifier and descriptor. The third row need not be the third row from the top or bottom of the table. Moreover, in some examples this association of the third value, and its associated identifier and third descriptor may also be stored in a reference data structure other than a row of a table.

In addition, in some example CRSMs, the instructions may further cause the processor to obtain the identifier from the table. In addition, the instructions may cause the processor to generate modified data by replacing the value in the stored data source with the identifier. Moreover, the instructions may cause the processor to generate transformed data by applying a transformation to the modified data. Further, the instructions may also cause the processor to output further modified data by obtaining from the table the value associated with the identifier and replacing in the stored data source the identifier with the value.

The example CRSMs described herein may also comprise instructions to cause a processor and/or system to perform the functions demonstrated in FIGS. 2 and 3, and to be used in the context of a DaaS ecosystem, for example as shown in FIG. 4.

While the examples described herein discuss the addition of the value, the second value, and the third value, and their corresponding descriptors and identifiers to a reference data structure, it is contemplated that additional values, from one or additional sources, may also be added to the reference data structure. For example, reference data table 245 comprises eight values and their corresponding identifiers and descriptors. Other example reference data structures may comprise a different number of values and their corresponding descriptors and identifiers.

Moreover, in the examples described above the descriptor is described as identifying the source data structure from which the value is obtained. As such, adding the descriptor to the reference data structure incorporates into the reference data structure the information regarding the source data structure of the value. Having this information in the reference data structure may allow for later connecting or linking the value and identifiers stored in the reference data structure to the corresponding source data structures, and modifying the source data structures by replacing the values in the source date structures with the corresponding identifiers as indicated in the reference data structure.

In other examples, the descriptor need not identify the source data structure, and may comprise a description of the attribute and/or type associated with the value. For example, referring to table 245 shown in FIG. 2, "companyname" may be the descriptor associated with the value "Saltee Nuts, Ltd", indicating that "Saltee Nuts, Ltd" is a company name. Other company name values from different source data structures may have the same descriptor "companyname".

This type of descriptor may allow for querying the reference data structure based on a given descriptor to obtain the values, and their corresponding identifiers, that are associated with the attribute and/or type corresponding to the given descriptor. In examples where the descriptors need not identify the source data structure, the descriptors alone may not be sufficient to provide a link between the values in the reference data structure and the source data structures from which the values were originally obtained.

In some examples, the methods, systems, and CRSMs described herein may be implemented using data structures and/or platforms that are compatible with and/or able to execute Structured Query Language (SQL) queries.

The methods, systems, and CRSMs described herein may allow for data processing and storage using reduced storage and/or computational resources by allowing data processing and/or storage using identifiers that may comprise shorter strings compared to their corresponding longer string values such as long serial numbers.

In addition, because the features and functionalities described herein use basic functionality, such as generating data tables, that are commonly available in many platforms, the methods, systems, and CRSMs described herein may be portable between a large number of platforms. For example, the methods, systems, and CRSMs described herein may be portable among platforms which are compatible with and/or able to execute SQL queries.

Moreover, the methods, systems, and CRSMs described herein may include the features and/or perform the functions described herein in association with one or a combination of the other methods, systems, and CRSMs described herein.

It should be recognized that features and aspects of the various examples provided above may be combined into further examples that also fall within the scope of the present disclosure.

The invention claimed is:

1. A method comprising:
obtaining from a source table a value from a column of the source table;
storing in a row of a lookup table the value in association with a descriptor of the column, the descriptor stored in the row of the lookup table, the descriptor identifying the source table and the column from among a plurality of different source tables that include different columns;
storing an identifier in the row of the lookup table, the identifier unique to the value among values stored in the column of the source table, wherein the identifier is selected to be a shorter representative of the value; and
outputting the lookup table, wherein the row of the lookup table is to allow conversion between the value and the identifier stored in the row with respect to the source table and column identified by the descriptor that is also stored in the row.

2. The method of claim 1, wherein the descriptor comprises a name of the source table and a name of the column.

3. The method of claim 1, wherein the identifier is incrementable.

4. The method of claim 3, further comprising:
obtaining from the column of the source table a further value different from the value;
storing in a further row of the lookup table the further value in association with the descriptor;
generating a further identifier by incrementing the identifier; and
storing the further identifier in the further row of the lookup table;
wherein the identifier and the further identifier distinguish between the value and the further value that are from the same source table and same column within the source table.

5. The method of claim 1, further comprising:
obtaining a further value from a different column of a different source table;
storing in a further row of the lookup table the further value in association with a further descriptor different from the descriptor, wherein the further descriptor identifies the different column of the different source table; and
storing the identifier in the further row.

6. The method of claim 1, further comprising:
obtaining the identifier from the lookup table;
generating modified data by replacing the value in the source table with the identifier;
generating transformed data by applying a transformation to the modified data; and
outputting further modified data by obtaining from the lookup table the value associated with the identifier and replacing in the source table the identifier with the value.

7. A system comprising:
a memory to store a value of an attribute;
a processor in communication with the memory, the processor to:
obtain from a source data structure the value;
store in a lookup table the value in association with a descriptor identifying the source data structure and the attribute, wherein the descriptor identifies the source data structure and the attribute from among a plurality of different source data structures that include different attributes, wherein the descriptor and value are stored in a same row of the lookup table;
store in the lookup table an identifier in association with the value, the identifier being incrementable, the identifier unique to the value among values associated with the descriptor, wherein the identifier is selected to be a shorter representative of the value; and
output the lookup table.

8. The system of claim 7, wherein the value, the descriptor, and the identifier are stored the same row of the lookup table.

9. The system of claim 7, wherein:
the source data structure comprises a data table having an associated table identifier, the data table comprising a column having an associated column identifier, the value being stored in the column; and
the descriptor comprises the table identifier and the column identifier.

10. The system of claim 7, wherein the processor is further to:
obtain from the source data structure a further value different from the value;
store in the lookup table the further value in association with the descriptor;
generate a further identifier by incrementing the identifier; and
store in the lookup table the further identifier in association with the further value.

11. The system of claim 7, wherein the processor is further to:
obtain a further value;
store in the lookup table the further value in association with a further descriptor different from the descriptor; and
store in the lookup table the identifier in association with the further value.

12. The system of claim 7, wherein the processor is further to:
obtain the identifier from the lookup table;
generate modified data by replacing the value in the source data structure with the identifier;

generate transformed data by applying a transformation to the modified data; and output further modified data by obtaining from the lookup table the value associated with the identifier and replacing in the source data structure the identifier with the value.

13. A non-transitory computer-readable storage medium comprising instructions executable by a processor, the instructions to cause the processor to:

obtain from a stored data source a value of an attribute;

store in a row of a lookup table the value in association with a descriptor identifying the stored data source and the attribute from among a plurality of different source data structures that include different attributes, the descriptor being stored in the row of the lookup table;

store an identifier in the row of the lookup table, the identifier being unique to the value to differentiate the value from among values associated with the descriptor; and output the lookup table, wherein the row of the lookup table is to allow conversion between the value and the identifier stored in the row of the lookup table with respect to the stored data source and attribute identified by the descriptor that is also stored in the row of the lookup table.

14. The non-transitory computer-readable storage medium of claim 13, wherein:

the stored data source comprises a data table having an associated table identifier, the data table comprising a column having an associated column identifier, the value being stored in the column.

15. The non-transitory computer-readable storage medium of claim 14, wherein the descriptor comprises the table identifier and the column identifier.

16. The non-transitory computer-readable storage medium of claim 13, wherein the identifier is incrementable.

17. The non-transitory computer-readable storage medium of claim 16, wherein the instructions further cause the processor to:

obtain from the stored data source a further value different from the value;

store in a further row of the lookup table the further value in association with the descriptor;

generate a further identifier by incrementing the identifier; and store in the further row the further identifier in association with the further value.

18. The non-transitory computer-readable storage medium of claim 13, wherein the instructions further cause the processor to:

obtain a further value;

store in a further row of the lookup table the further value in association with a further descriptor different from the descriptor; and store in the further row the identifier in association with the further value.

19. The non-transitory computer-readable storage medium of claim 13, wherein the instructions further cause the processor to:

obtain the identifier from the lookup table;

generate modified data by replacing the value in the stored data source with the identifier;

generate transformed data by applying a transformation to the modified data; and output further modified data by obtaining from the lookup table the value associated with the identifier and replacing in the stored data source the identifier with the value.

* * * * *